US011084271B1

(12) United States Patent
Gollier

(10) Patent No.: US 11,084,271 B1
(45) Date of Patent: Aug. 10, 2021

(54) LAMINATING PLANAR FILMS ONTO CURVED SURFACES

(71) Applicant: Facebook Technologies, LLC, Menlo Park, CA (US)

(72) Inventor: Jacques Gollier, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 624 days.

(21) Appl. No.: 15/892,423

(22) Filed: Feb. 9, 2018

(51) Int. Cl.
*B32B 38/00* (2006.01)
*B32B 41/00* (2006.01)
*G02B 5/30* (2006.01)
*G02B 27/28* (2006.01)
*B32B 37/18* (2006.01)
*B32B 37/12* (2006.01)

(52) U.S. Cl.
CPC .......... *B32B 38/0004* (2013.01); *B32B 37/18* (2013.01); *B32B 41/00* (2013.01); *B32B 37/12* (2013.01); *B32B 2551/00* (2013.01); *G02B 5/3025* (2013.01); *G02B 27/28* (2013.01)

(58) Field of Classification Search
CPC ..... B32B 38/0004; B32B 37/18; B32B 41/00; B32B 2551/00; B32B 37/12; G02B 27/28; G02B 5/3025; G02B 27/0127
See application file for complete search history.

(56) References Cited

U.S. PATENT DOCUMENTS

| 3,981,345 | A | * | 9/1976 | Alberny | B22D 11/12 164/468 |
| 4,706,540 | A | * | 11/1987 | Donohoe | G10D 13/20 84/414 |
| 8,687,275 | B2 | * | 4/2014 | Coleman | B29D 11/00644 359/489.14 |
| 9,097,854 | B2 | * | 8/2015 | Witzman | B42D 15/00 |
| 2006/0126183 | A1 | * | 6/2006 | Hasman | G02B 5/1809 359/573 |
| 2011/0196525 | A1 | * | 8/2011 | Bogue | G05B 13/02 700/103 |
| 2011/0223373 | A1 | * | 9/2011 | Abrams | D06Q 1/14 428/90 |
| 2012/0283799 | A1 | * | 11/2012 | Fan | A61N 1/0543 607/54 |
| 2017/0255015 | A1 | * | 9/2017 | Geng | G02B 6/08 |

* cited by examiner

*Primary Examiner* — Jacob T Minskey
*Assistant Examiner* — Caroline Montiel
(74) *Attorney, Agent, or Firm* — Fenwick & West LLP

(57) ABSTRACT

This present disclosure describes a system and process for laminating a planar film sheet onto a curved surface of an optical element. One or more cuts to a planar film sheet are determined based in part on a curved surface of an optical element. The planar film sheet is cut along the determined one or more cuts to the planar film sheet to form a lamination sample. And the lamination sample has a plurality of stress relief boundaries that correspond to the determined one or more cuts to the planar film sheet. The lamination sample is laminated to the curved surface of the optical element to form a laminated coating on the optical element. And adjacent stress relief boundaries of the plurality of stress relief boundaries are in contact with each other, such that the laminated coating is a continuous film across the curved surface.

12 Claims, 7 Drawing Sheets

LAMINATING PLANAR FILMS ONTO CURVED SURFACES

BACKGROUND

The present disclosure generally relates to applications of films to surfaces, and specifically relates to laminating a planar film sheet onto a surface that is curved in two-dimensions.

Typically when attempting to laminate a planar film sheet onto an optical element curved in two-dimensions, tangential forces and radial forces arise due to the difference in curvature of the planar film sheet and the curved optical element causing degradation of optical properties of the planar film sheet. The degradation of optical properties of the planar film sheet can render the optical element inaccurate or imprecise.

SUMMARY

Embodiments relate to a system, a method, and a computer-readable medium that facilitate processing of a planar film (e.g., a polarizer) sheet such that it may be laminated onto an optical element that is curved in at least two dimensions. One or more cuts to a planar film sheet is determined based in part on a curved surface of an optical element. In some embodiments, the one or more cuts to a planar film sheet is a spiral cut. The curved surface is curved in at least two dimensions (e.g., spherically concave). The planar film sheet is cut along the determined one or more cuts to the planar film sheet to form a lamination sample. The lamination sample has a plurality of stress relief boundaries that correspond to the determined one or more cuts to the planar film sheet. The lamination sample is laminated to the curved surface of the optical element to form a laminated coating on the optical element. In the laminated coating, adjacent stress relief boundaries of the plurality of stress relief boundaries are in contact with each other, such that the laminated coating is a continuous film across the curved surface. Optical elements coated with laminated coatings as applied by this system, this method, or processes facilitated by this computer-readable medium, may be used in, e.g., a head-mounted display (HMD).

DETAILED DESCRIPTION OF THE DRAWINGS

Configuration Overview

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic sensation, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Artificial reality systems include a HMD. The HMD includes an electronic display which renders images for the artificial reality. The HMD also contains an optics block which is configured to present the images from the electronic display to a user of the artificial reality system. The optics block can include multiple optical components, each of which may have one or more coatings with optical properties. The process of laminating the one or more coatings on an optical element comprises modeling stress in lamination, processing a lamination sample, laminating the lamination sample onto the optical element. The coatings can provide a varietal selection of changes to the optical properties of the optics block.

Manufacturing System for Lamination of Planar Films

Figure 1:
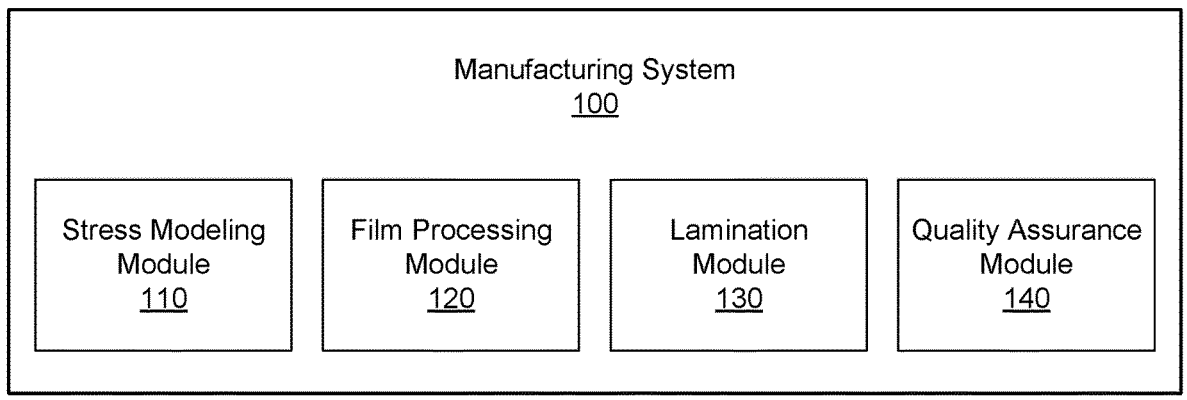
FIG. 1 is block diagram of a manufacturing system, in accordance with one or more embodiments.

FIG. 1 is block diagram representing a manufacturing system 100, in accordance with an embodiment. The manufacturing system 100 comprises a stress modeling module 110, a film processing module 120, a lamination module 130, and a quality assurance module 140, in accordance with an embodiment. The manufacturing system 100 modifies a planar film sheet and laminates the modified planar film sheet on a surface, of an optical element, that is curved in at least two dimensions. The planar film sheet is a flexible lamination film. The planar film sheet is generally planar, but may be rolled about a single axis to form a cylinder. The planar sheet film may be, e.g., a polarizer (e.g., linear, circular, etc.), a reflective film, a waveplate (e.g., half, quarter, etc.), some other flexible lamination film, or some combination thereof. The planar film sheet changes the optical properties of the optical element. In other embodiments, the manufacturing system 100 comprises additional or fewer modules than those described herein. Similarly, the functions can be distributed among the modules and/or different entities in a different manner than is described here.

The stress modeling module 110 determines one or more cuts to a planar film sheet based in part on a curved surface of an optical element. The stress modeling module 110 receives a request to laminate a planar film sheet on a surface (e.g., of an optical element) that is curved in at least two dimensions. The curvature may be, e.g., spherical, aspherical, convex, concave, rotationally symmetric, rotationally asymmetric, free form, or some combination thereof. The request may include, e.g., parameters of the planar film sheet, parameters of the curved the optical element, or some combination thereof. A parameter of the planar film sheet describes characteristics of the planar film sheet. A parameter of the planar film sheet may be, e.g., a dimension (e.g., length, width, thickness) of the planar film sheet, material composition of the planar film sheet, elasticity of the planar film sheet, some material property of the planar film sheet, some optical property of the planar film sheet, some other characteristic of the planar film sheet, or some combination thereof. A parameter of the optical element describes characteristics of the optical element. A parameter of the optical element may be, e.g., a curvature of a lamination surface of the optical element, a dimension (e.g., length, width, thickness) of the optical element, material composition of the optical element, some material property of the optical element, some optical property of the optical element, some other characteristic of the optical element, or some combination thereof.

The stress modeling module 110 analyzes the parameters of the planar film sheet and of the optical element to determine cuts to be made on the planar film sheet. The stress modeling module 110 determines locations and curves of cuts so as to reduce tangential and radial stress on the planar film sheet when laminating a portion of the planar film sheet onto the curved surface. The locations and shapes of the cuts are based on parameters of the planar film sheet and of the optical element, e.g., elasticity of the planar film sheet and curvature of the lamination surface. For example, the determined cuts can vary depending on the elasticity of the planar film sheet as a more elastic sheet can endure larger amounts of stress than a less elastic sheet. In another example, the determined cuts can vary depending on the curvature of the optical element. In this example, some portions of the optical element might have curvatures below a threshold curvature causing an insignificant amount of stress that can be endured by the planar film sheet which would be disregarded by the stress modeling module 110; whereas, other portions of the optical element might have curvatures above the threshold curvature causing a significant stress on the planar film sheet which would be addressed by the determined cuts by the stress modeling module. Likewise, the stress modeling module 110 determines a cut of a shape and of an area for the lamination sample depending on an area of the lamination surface.

The stress modeling module 110 determines patterned cuts based on the parameters of the planar film sheet and of the optical element. In accordance with one or more embodiments, the stress modeling module 110 selects between three patterns for cutting the planar film sheet—radial wedge cuts pattern, annulus cuts pattern, and spiral cut pattern. These three patterns balance relief of stress during lamination and ease in processing and laminating. Radial wedge cut patterns can be problematic due to stress regions that occur in the pattern (discussed in detail below). And annulus cuts patterns can be difficult to implement in practice. Accordingly, the spiral cut pattern is a preferred cut pattern as the spiral cut pattern mitigates stress from the planar film sheet and is relatively easy implement. In some embodiments, the stress modeling module 110 prompts a user to assign priority for determining which of the three patterns to select. For example, the stress modeling module 110 contains a weighted priority to select the radial wedge cuts pattern for laminating a planar film sheet onto a spherically curved optical element. Upon determining the cuts to be made on the planar film sheet, the stress modeling module 110 relays the cuts to the film processing module to turn the planar film sheet into a lamination sample.

The radial wedge cuts pattern comprises a plurality of more than one radial wedge cuts in the planar film sheet. Each radial wedge cut starts from two points along a periphery of the planar film sheet towards a singular point within an interior portion of the planar film sheet. Due to a radial wedge cut coming to a singular point within the interior portion, the result is a stress region vulnerable to failure. The stress modeling module 110 strategically places the stress region in a portion of the planar film sheet so as to avoid regions which would undergo high stress during lamination. For example, the stress modeling region 110 identifies a high stress region along an outer portion of the lamination surface of the curved optical element and determines to place the stress region caused by the radial wedge cut a distance away from the high stress region. Between the two points along the periphery of the planar film sheet is defined as a radial wedge width. Drawing a perpendicular from the line between the two points along the periphery of the planar film sheet to the singular point within the interior of the planar film sheet is defined as a radial wedge depth. The stress modeling module 110 determines different shapes of the radial wedge cuts and/or different number of radial wedge cuts to accommodate different curved optical elements such as aspherical lenses or concave lenses. For example, the stress modeling module 110 determines radial wedge cuts which comprise linear cuts from the two points along the periphery of the planar film sheet to the singular point within the interior portion of the planar film sheet. In another example, the stress modeling module 110 determines radial wedge cuts which comprise curved cuts from each of the two points along the periphery to the singular point within the interior.

These variations in radial wedge shape are based at least in part on the curvature of the optical element. For example, if the optical element is a parabolic lens, the curvature of the parabolic lens decreases depending on radial distance from a center of the parabolic lens. In this example, the stress modeling module 110 determines radial wedge cuts with curved cuts. The stress modeling module 110 also determines the radial wedge width and the radial wedge depth based on the parameters of the planar film sheet and the parameters of the optical element. In accordance with some embodiments, each radial wedge cut of the plurality of radial wedge cuts are identical and evenly dispersed around the planar film sheet radially. In these embodiments, each radial wedge has identical dimension, e.g., identical radial wedge shape, identical wedge width, identical radial wedge depth, etc. In other embodiments, the stress modeling module 110 determines one or more radial wedge cuts of the plurality of radial wedge cuts to differ from other radial wedge cuts of the plurality of radial wedge cuts.

The annulus cut pattern comprises a plurality of more than one annulus cuts in the planar film sheet. In one or more embodiments, each annulus cut is a circular cut such that all the annulus cuts of the plurality are concentric circular cuts. The plurality of annulus cuts result in a central circular portion with a radius and a plurality of annuli portions with each having an annulus width, wherein the central circular portion and the plurality of annuli portions. The stress modeling module 110 determines the radius of the central circular portion based on the curvature of the optical element being within a threshold curvature. For example, the stress modeling module 110 determines a larger central circular portion for an optical element with a larger central portion within a threshold curvature compared to an optical element with a smaller central portion within the threshold curvature. The stress modeling module 110 determines a number of annulus cuts and the annulus width of each annulus cut based on the curvature of the optical element. For example, if the curvature of the optical element is significantly larger outside the central portion of the planar film sheet, then the stress modeling module 110 can increase the number of annulus cuts while decreasing the annulus width of each annulus cut. In some embodiments, one or more annulus widths are different than other annulus widths such that there are annuli portions of varying widths. In other embodiments, the annulus cuts vary in shape as the optical element is radially asymmetric.

The spiral cut pattern, the preferred pattern, comprises one spiral cut in the planar film sheet. The spiral cut starts at a point in the interior of the planar film sheet and proceeds to a point on the periphery of the planar film sheet increasing by a spiral width. In preferred embodiments, the spiral cut is a portion of an Archimedean spiral with a constant spiral width. In such embodiments, the stress modeling module 110 determines the spiral width for the spiral cut based on the parameters of the optical element. For example, the stress modeling module 110 determines a smaller spiral width for a lamination surface of the curved optical element with a large curvature. In other embodiments, the stress modeling module 110 determines to adjust the spiral width based on the curvature of the lamination surface such that the spiral width adjusts as the spiral continues to the periphery of the lamination film.

The film processing module 120 cuts the planar film sheet along the determined one or more cuts to the planar film sheet to form a lamination sample, in accordance with an embodiment. The film processing module 120 receives instructions comprising cuts to the planar film sheet as determined by the stress modeling module 110. In other embodiments, the instructions further comprise steps for processing the planar film sheet, e.g., curing the planar film sheet, depositing chemicals on the planar film sheet, and applying adhesive to the planar film sheet. In some embodiments, to cut the planar film sheet, the film processing module 120 utilizes a laser to cut the planar film sheet according to the determined cuts. In other embodiments, the film processing module 120 utilizes a blade, a stencil, another device for cutting, or some combination thereof. The film processing module 120 cuts the planar film sheet along the determined cuts resulting in one or more stress relief boundaries in the lamination sample. The one or more boundaries in the lamination sample provide stress relief when the lamination sample is laminated onto the curved optical element. In some instances, after making the cuts to the planar film sheet resulting in the lamination sample, the film processing module 120 may remove unwanted portions of the lamination sample. For example, if the film processing module 120 cuts according to the radial wedge cuts pattern, the film processing module 120 also removes the radial wedges.

The lamination module 130 laminates a lamination sample onto a curved optical element to form a laminated coating, in accordance with an embodiment. The laminated coating on the curved optical element is a continuous film across the portion coated with the laminated coating. The laminated coating varies the optical properties of the optical element, e.g., the laminated coating is a polarizer, a waveplate, a filter of some sort (i.e. neutral density, bandwidth, dichroic, etc.), an immersed electrode array, or a reflector. In accordance with the above embodiment, the lamination module 130 receives the lamination sample from the film processing module 120. In some embodiments, the lamination module 130 applies an adhesive coating onto the lamination sample; whereas in other embodiments, the lamination sample has an adhesive coating already. The lamination module 130 laminates the lamination sample onto a corresponding curved surface of the curved optical element such that stress relief boundaries come into contact with each other. The lamination module 130 laminates the stress relief boundaries to be in contact with each other such that the lamination sample forms a laminated coating which is a continuous film across the curved optical element. In some embodiments, the lamination module 130 applies heat so as to cure the lamination coating onto the optical element. In other embodiments, the lamination module 130 deposits a thin layer of sealant so as to seal the lamination coating to the optical element.

The laminated coating has a local rotation when utilizing the spiral cut pattern in the preferred embodiment. The local rotation occurs as the lamination sample with the spiral cut pattern is laminated onto the optical element. The local rotation may affect optical properties for laminated coating. Specifically with laminated coatings such as polarizers, the optical properties of the laminated coatings depends at least in part on an orientation of the laminated coating. For example, a linear polarizer takes unpolarized light and converts that into light with a linear polarization. The linear polarization would rotate if the linear polarizer is rotated. In the case of the linear polarizer, the local rotation causes gradual rotation of the linear polarization of light coming through the linear polarizer. This effect can be mitigated when the optical element with the laminated coating as a linear polarizer is utilized in combination with a quarter-waveplate (i.e., a circular polarizer). The combination of a quarter-waveplate and a linear polarizer turns unpolarized light into circularly polarized light regardless of the local rotation. In other circumstances, effects of the local rotation can be aligned by the lamination module with effects of another local rotation on another optical element such that the effects of each local rotation counteracts the other.

The quality assurance module 140 characterizes a quality of a laminated coating on an optical element. In checking whether the lamination sample is laminated correctly, the quality assurance module 140 applies one or more quality standards. A quality standard is a metric used to determine a quality level of the laminated coating. The quality standards may include, e.g., a uniformity of the laminated coating, a durability of the laminated coating, amount of aberration, amount of contrast, amount of light transmitted, polarization of light transmitted, some other metric used to determine a quality level of the laminated coating, or some combination thereof. For example, the quality assurance module 140 checks the uniformity of the laminated coating by checking whether any portion of the laminated coating overlaps another portion of the laminated coating or whether any portion of the curved surface of the optical element lacks the laminated coating. In another example, the quality assurance module 140 checks polarization of transmitted light from a linear polarizer laminated coating for axis of polarization. In an alternate example, the quality assurance module 140 checks consistency of circular polarization of light of a quarter-waveplate laminated coating and a linear polarizer laminated coating in combination.

Figure 2:
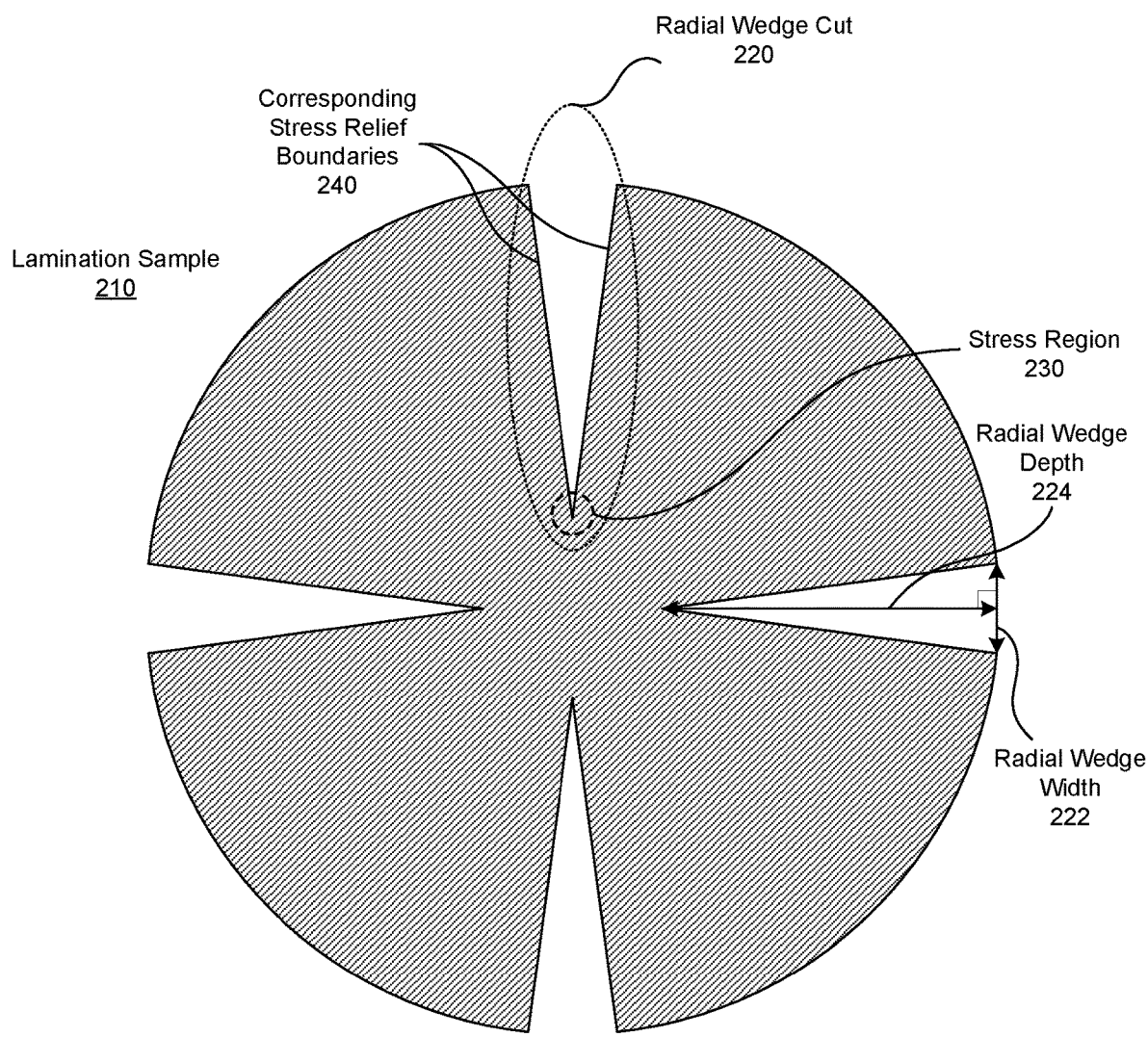
FIG. 2 is a top plan view of a lamination sample with radial wedge cuts in accordance with one or more embodiments.

FIG. 2 is a top plan view of a lamination sample 210 with radial wedge cuts, in accordance with an embodiment. The lamination sample 210 is an embodiment of the lamination sample as described in regards to FIG. 1. A planar film sheet is processed to form the lamination sample 210. The lamination sample 210 is cut to a target shape and has a plurality of identical radial wedge cuts evenly placed radially. Similar to that described in regards to FIG. 1, a radial wedge cut 220 of the plurality of radial wedge cuts comprises two linear cuts with each cut starting from one of two points along the periphery of the lamination sample 210 to a point in the interior of the lamination sample 210. In this embodiment, each radial wedge portion has been removed. The radial wedge cut 220 has a stress region 230 along the interior of the lamination sample 210. The stress region 230 is a point of interest as a vulnerable point in the lamination sample 210. The stress region 230 is strategically placed close to a center of the lamination sample 210 such that it avoids high stress areas along an outer portion of the lamination sample 210. Along the radial wedge cut 220, there are corresponding stress relief boundaries 240 which result from the two cuts of the radial wedge cut 220. The corresponding stress relief boundaries 240 are brought together during lamination so as to provide a continuous film while relieving stress in the continuous film. The radial wedge cut 220 has a radial wedge width 222 and a radial wedge depth 224. Both the radial wedge width 222 is determined such that after lamination the circumference of the lamination sample 210 is at most a circumference of an edge of the lamination surface on the curved optical element. The radial wedge depth 224 is determined such that the lamination sample 210 maximizes stress reduction throughout the lamination sample 210.

Figure 3:
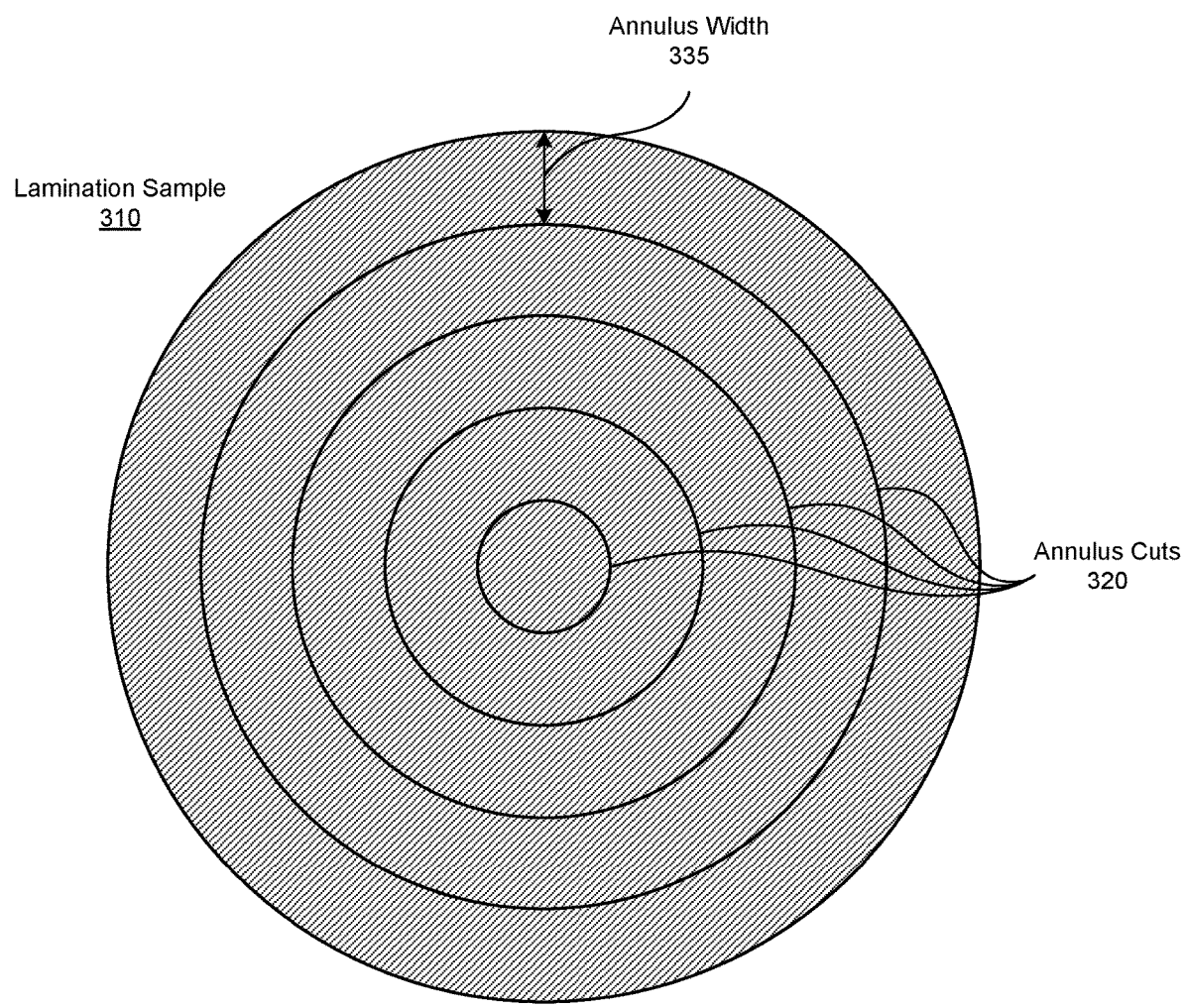
FIG. 3 is a top plan view of a lamination sample with annulus cuts, in accordance with one or more embodiments.

FIG. 3 is a top plan view of a lamination sample 310 with annulus cuts, in accordance with one or more embodiments. The lamination sample 310 is an embodiment of the lamination sample as described in regards to FIG. 1. A planar film sheet is processed to form the lamination sample 310. The lamination sample 310 is circular in shape and has a plurality of annulus cuts 320 all of which are concentric and circular. The plurality of annulus cuts 320 comprises four annulus cuts, in accordance with this illustration. The lamination sample 310 is portioned by the plurality of annulus cuts 320 into a central circle and a plurality of concentric, non-overlapping annuli each having a constant annulus width 335. Along each annulus cut, there are two corresponding stress relief boundaries on either side. As the central circle and the plurality of concentric, non-overlapping annuli are laminated onto the lamination surface of the curved optical element, corresponding stress relief boundaries are brought together during lamination so as to provide a continuous film while relieving stress in the continuous film. The annulus width 335 is constant in this embodiment over all the annulus cuts 320; however, in other embodiments, with varying curvatures of optical elements the annulus width may change. For example, an optical element with a greater overall curvature can be adapted to have a smaller annulus width and more annulus cuts so as to relieve more stress with the additional stress relief boundaries. In other embodiments, the annulus width can also vary per annulus cut. For example, a parabolic lens can have a first annulus width for annulus cuts towards a center of the lamination sample with a second annulus width for annulus cuts towards a periphery of the lamination sample so as to provide greater stress relief for portions of the parabolic lens with greater curvature.

Figure 4:
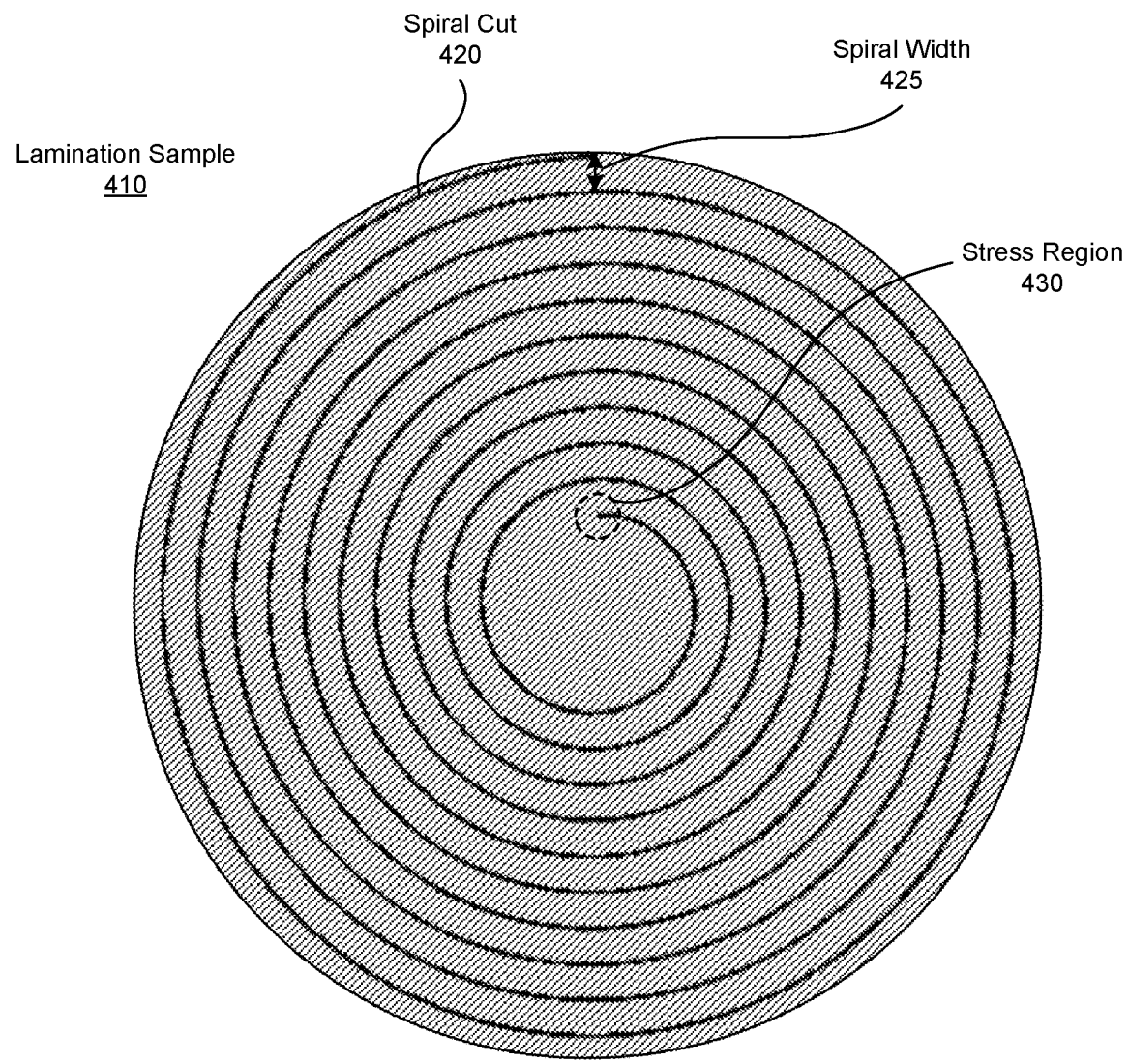
FIG. 4 is a top plan view of a lamination sample with a spiral cut, in accordance with one or more embodiments.

FIG. 4 is a top plan view of a lamination sample 410 with a spiral cut 420, in accordance with one or more embodiments. The lamination sample 410 is an embodiment of the lamination sample as described in regards to FIG. 1. A planar film sheet is processed to form the lamination sample 410. The lamination sample 410 is circular in shape and has the spiral cut 420. As described in the spiral cut pattern in FIG. 1, the spiral cut 420 starts from a point in the interior of the lamination sample 410 and spirals to a point along the periphery of the lamination sample 410. The spiral cut 420 has a spiral width 425 of a constant size throughout the spiral cut, in accordance with this illustration. Along the spiral cut 420 are two corresponding stress relief boundaries on either side of the cut. Differing from the lamination sample 210 of FIG. 2 and the lamination sample 310 of FIG. 3, the lamination sample 410 remains as a single portion. During lamination of the lamination sample 410, the lamination module starts from a center of the lamination sample 410 and gradually applies the lamination sample 410 following the spiral cut 425 such that the corresponding stress relief boundaries can be brought together so as to provide a continuous film while relieving stress in the continuous film. The spiral width 425 is relatively small in this embodiment about a twelfth of a radius of the lamination sample 410; however, the spiral width may vary with differing curvatures of other optical elements. For example, an optical element with a greater curvature can utilize a smaller spiral width so as to afford greater stress relief. In a converse example, an optical element with a smaller curvature can utilize a bigger spiral width.

Pancake Lens Application

Figure 5:
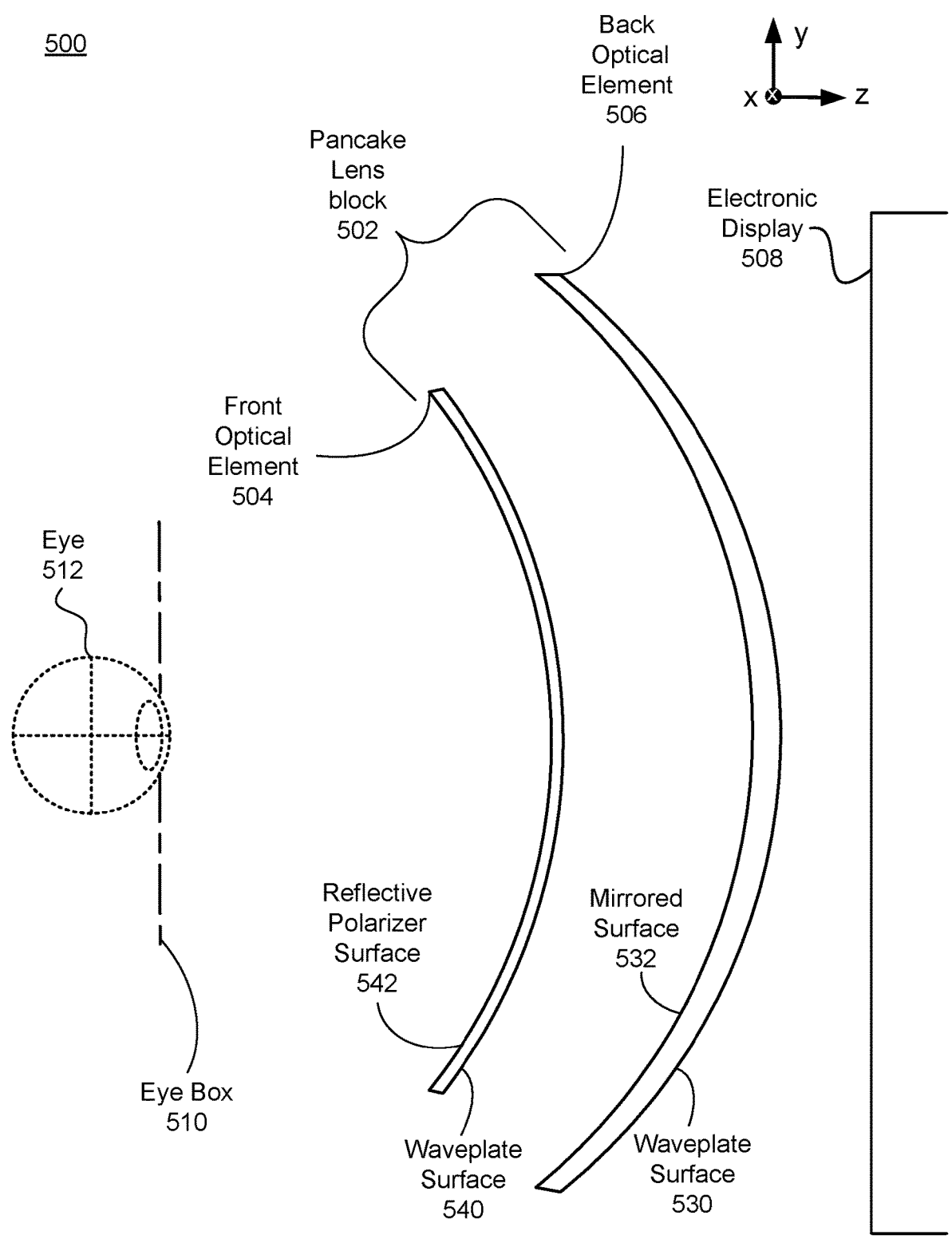
FIG. 5 is a cross sectional view of a pancake lens block, in accordance with one or more embodiments.

FIG. 5 is a cross sectional view 500 of a pancake lens block 502, in accordance with one or more embodiments. In some embodiments, the pancake lens block 502 is part of a head mounted display (HMD) and includes a front optical element 504 and a back optical element 506 that focuses light from an electronic display 508 to an eye box 510 where a user's eye 512 is positioned. For purposes of illustration, FIG. 5 shows the cross sectional view 500 of the pancake lens block 502 associated with a single eye 512, but another pancake display assembly, separate from the pancake lens block shown in FIG. 5, can provide altered image light to another eye of the user. Some embodiments of the pancake display assembly have different components than those described here. Similarly, in some cases, functions can be distributed among the components in a different manner than described here.

Light emitted from the electronic display 508 is linearly polarized. In some embodiments, the electronic display 508 includes one or more linear polarizers that linearly polarizers light emitted from the electronic display 508. Alternatively, light emitted from light emitting components (e.g., LEDs) is emitted as linearly polarized light.

The pancake lens block 502 includes the front optical element 504 and the back optical element 506. One or more surfaces of the front optical element 504 and the back optical element 506 are shaped to correct for field curvature. One or more surfaces of the front optical element 504 may be shaped to be spherically concave (e.g., a portion of a sphere), spherically convex, a rotationally symmetric asphere, a freeform shape, or some other shape that mitigates field curvature. In some embodiments, the shape of one or more surfaces of the front optical element 504 and the back optical element 506 are designed to additionally correct for other forms of optical aberration. In some embodiments, one or more of the optical elements within the pancake lens block 502 may have one or more coatings, such as anti-reflective coatings, to reduce ghost images and enhance contrast. The one or more coatings may be laminated on the one or more optical elements within the pancake lens block 502 as described in regards to FIG. 1-4.

The back optical element 506 includes a waveplate surface 530 and a mirrored surface 532. In accordance with an embodiment, the waveplate surface 530 and the mirrored surface 532 are laminated coatings which are applied onto the back optical element 506 by the manufacturing system 100 of FIG. 1. In this example, the waveplate surface 530 is a quarter-waveplate that shifts polarization of received light. The waveplate surface 530 converts linearly polarized light into circularly polarized light. Likewise, a quarter-waveplate converts circularly polarized light to linearly polarized light. Quarter-waveplates are usually made of birefringent materials such as quartz, organic material sheets, or liquid crystal. The mirrored surface 532 is partially reflective to reflect a portion of the received light. In some embodiments, the mirrored surface 532 is configured to transmit 50% of incident light and reflect 50% of incident light.

The front optical element 504 includes a waveplate surface 540 and a reflective polarizer surface 542. In accordance with an embodiment, the waveplate surface 520 and the reflective polarizer surface 542 are laminated coatings which are applied onto the back optical element 506 by the manufacturing system 100 of FIG. 1. The waveplate surface 540 is also a quarter-waveplate and the reflective polarizer surface 542 is a partially reflective mirror configured to reflect received light of a first linear polarization and transmit received light of a second linear polarization. For example, the reflective polarizer surface 542 may be configured to reflect linearly polarized light with a polarization direction in the x direction, and pass light that is linearly polarized in the y direction.

The pancake lens block 502 mitigates field curvature and accordingly acts to reduce pupil swim. Field curvature is an optical aberration that causes a flat object to appear sharp only in a certain part(s) of the frame, instead of being uniformly sharp across the frame. More generally, field curvature is a result of a focal distance of an optics system not perfectly aligning with all the points on a focal plane. Pupil swim is the effect caused by changes in the location of a user's eye within an eyebox results in distortions in the content being presented to the user. Correcting for field curvature mitigates pupil swim. The pancake display assembly mitigates field curvature in an image that is output to a user's eyes to reduce pupil swim. Additionally, the pancake lens block 502 has a small form factor, is relatively low weight compared to other optical systems designed to remove field curvature and is configured to have a wide field of view. The operation of pancake lens block 502 is discussed below with regard to FIG. 6.

Figure 6:
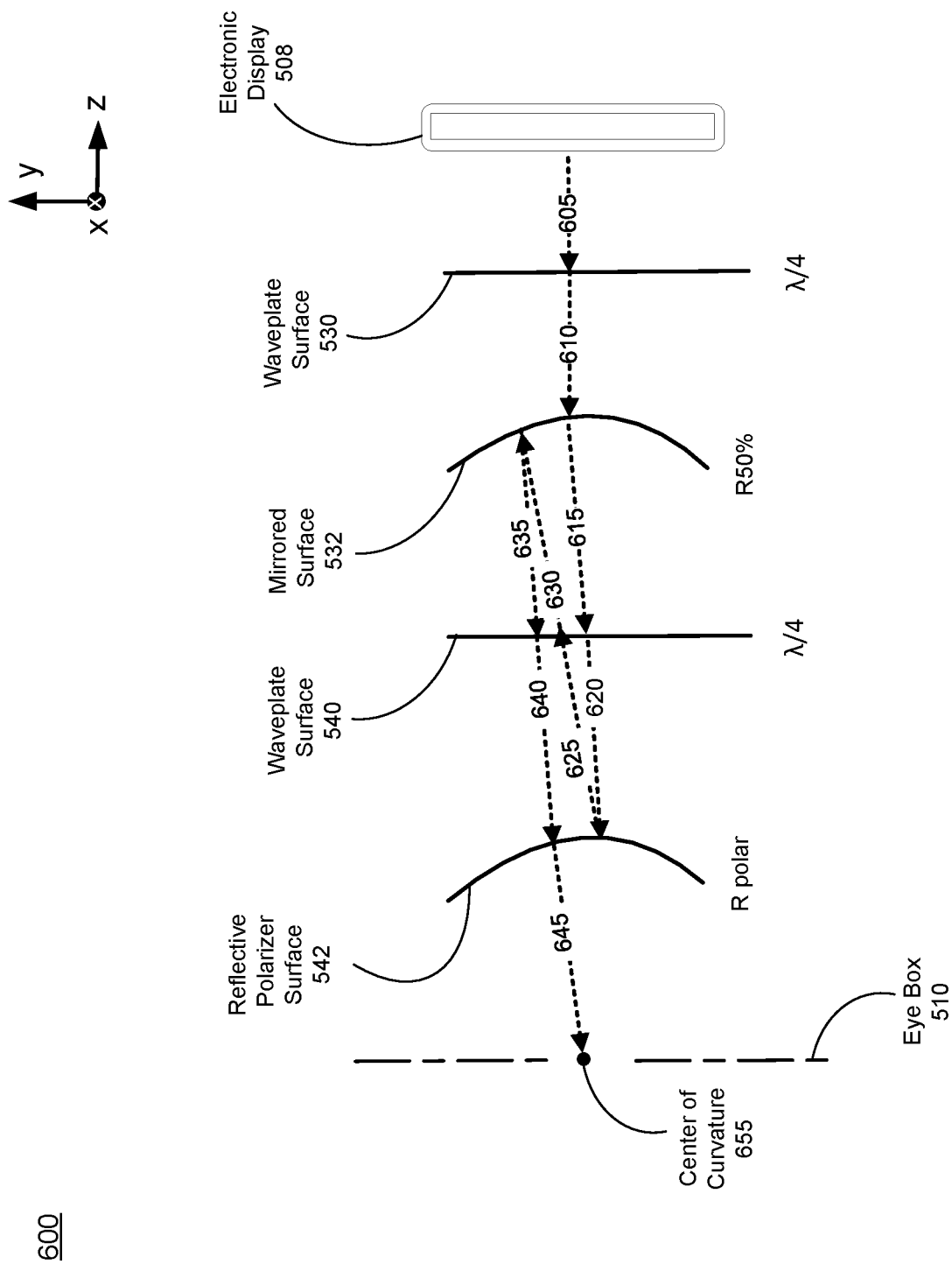
FIG. 6 shows example light propagation in the pancake lens block of FIG. 5, in accordance with one or more embodiments.

FIG. 6 shows example light propagation 600 in the pancake lens block 502 of FIG. 5, in accordance with one or more embodiments. Light 605 from the electronic display 508 is linearly polarized. The waveplate surface 530 is oriented relative to the y direction (which is the direction of polarization of light 605) to form circularly polarized light. The orientation of the waveplate axis relative to the incident linearly polarized light controls the handedness of the emitted circularly polarized light. The waveplate surface 530 changes the polarization of the light 605 from linear polarization to circular polarization—shown as light 610. The polarization of the light 610 may be clockwise or anticlockwise based on the orientation of the axis of the waveplate surface 530 relative to incident linearly polarized light. A first portion of the light 610 is reflected by the mirrored surface 532, and a second portion of the light 610 is transmitted by the mirrored surface 532 as light 615 towards the waveplate surface 540. In some embodiments, the mirrored surface 532 is configured to reflect 50% of incident light (e.g., the light 610). Similarly, the waveplate surface 540 is a quarter-waveplate and changes the polarization of the light 615 from circular to linear (referred to as light 620).

The light 620 is incident on the reflective polarizer surface 542, which reflects light that is polarized in a blocking direction (e.g., x direction) and transmits light that is polarized in a perpendicular direction (e.g., y direction). At this point, the light 620 is linearly polarized in the blocking direction. Thus, the reflective polarizer surface 542 reflects the light 620 and the reflected light is referred to as light 625. The waveplate surface 540 changes the linear polarized light 625 to circularly polarized light 630 and the mirrored surface 532 reflects a portion of the polarized light 630, as described above. The reflected portion of light 630 is referred to as light 635.

The light 635 is also circularly polarized; however, its handedness is opposite that of the light 630 and the light 615 due to the reflection from the mirrored surface 532. Thus, the waveplate surface 540 changes the polarization of the circularly polarized light 635 to linearly polarized light 640. However, as the handedness of the light 635 is opposite to that of the light 615, the polarization of the light 640 is perpendicular to that of the light 620. Accordingly, the light 640 is linearly polarized in a direction (e.g., y) perpendicular to the blocking direction (e.g., x) and is therefore transmitted by the reflective polarizer surface 542 as light 645 to the eye box 510.

Light propagating through the pancake lens block 502, thus, undergoes multiple reflections between the back optical element 506 and the front optical element 504 and passes through multiple materials (i.e., waveplates, reflectors, glass, air, etc.) each having different indices of refraction. These materials can be chosen to allow the back optical element 506 and the front optical element 504 to compensate each other to remove field curvature.

Figure 7:
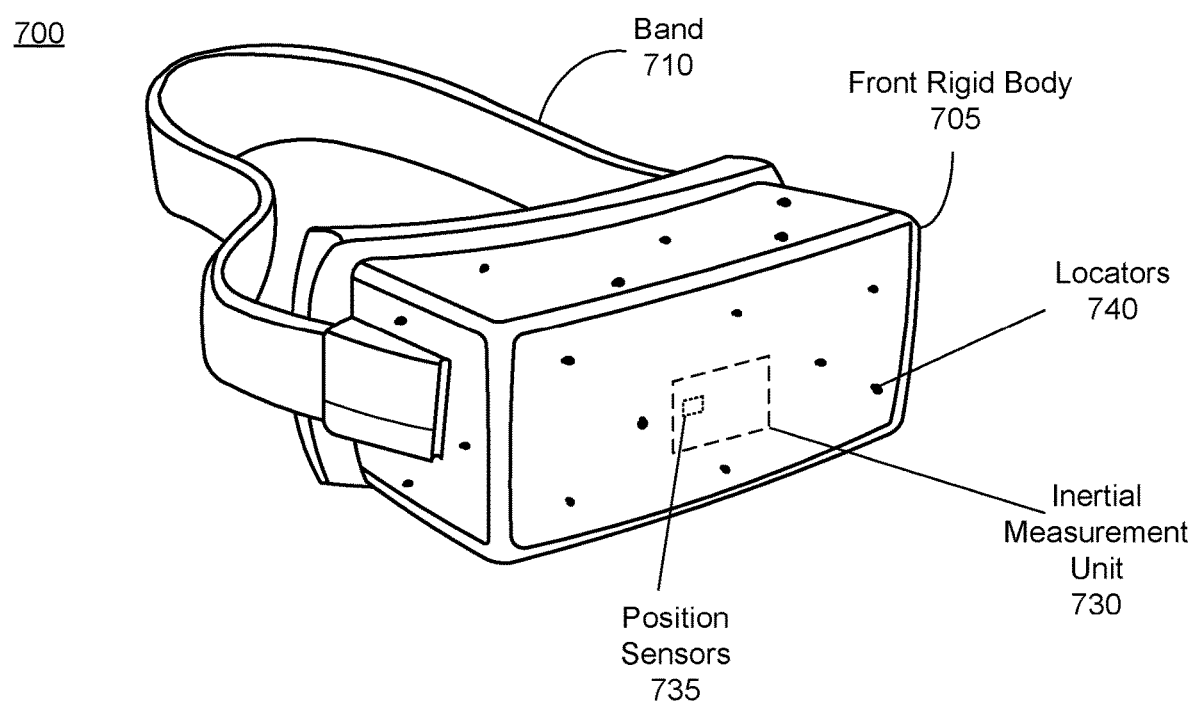
FIG. 7 is a perspective view of a head-mounted display (HMD), in accordance with one or more embodiments.

FIG. 7 is a perspective view of a head-mounted display 700 (HMD 700), in accordance with one or more embodiments. The HMD 700 includes a front rigid body 705 and a band 710. The front rigid body 705 includes one or more electronic display elements of an electronic display (e.g. electronic display 508 of FIG. 5), an optics block (e.g. pancake lens block 502 of FIG. 5), an inertial measurement unit 730 (IMU 730), one or more position sensors 735, and the locators 740. In the embodiment shown by FIG. 7, the position sensors 735 are located within the IMU 730, and neither the IMU 730 nor the position sensors 735 are visible to the user. Note in embodiments where the HMD 700 acts as an AR or MR device, portions of the HMD 700 and its internal components are at least partially transparent. The band 710 aids in securing the front rigid body 705 onto a user's head. The HMD 700 presents content to a user. Example content includes images, video, audio, or some combination thereof. Audio content may be presented via a separate device (e.g., speakers and/or headphones) external to the HMD 700.

Based on the measurement signals from the position sensors 735, the IMU 730 generates IMU data indicating an estimated position of the HMD 700 relative to an initial position of the HMD 700. For example, the position sensors 735 include multiple accelerometers to measure translational motion (forward/back, up/down, left/right) and multiple gyroscopes to measure rotational motion (e.g., pitch, yaw, and roll). The IMU 730 can, for example, rapidly sample the measurement signals and calculate the estimated position of the HMD 700 from the IMU data. For example, the IMU 730 integrates measurement signals received from the accelerometers over time to estimate a velocity vector and integrates the velocity vector over time to determine an estimated position of a reference point on the HMD 700. The reference point is a point that may be used to describe the position of the HMD 700. While the reference point may generally be defined as a point in space, in various embodiments, a reference point is defined as a point within the HMD 700 (e.g., a center of the IMU 730).

The locators 740 are objects located in specific positions on the HMD 700 relative to one another and relative to a specific reference point on the HMD 700. A locator 740 may be a light emitting diode (LED), a corner cube reflector, a reflective marker, a type of light source that contrasts with an environment in which the HMD 700 operates, or some combination thereof. Active locators 740 (i.e., an LED or other type of light emitting device) may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

The locators 740 can be located beneath an outer surface of the HMD 700, which is transparent to the wavelengths of light emitted or reflected by the locators 740 or is thin enough not to substantially attenuate the wavelengths of light emitted or reflected by the locators 740. Further, the outer surface or other portions of the HMD 700 can be opaque in the visible band of wavelengths of light. Thus, the locators 740 may emit light in the IR band while under an outer surface of the HMD 700 that is transparent in the IR band but opaque in the visible band.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
   determining one or more cuts to a planar film sheet based in part on a curved surface of an optical element, wherein the curved surface is curved in at least two dimensions, and wherein the determined one or more cuts to the planar film sheet comprises a spiral pattern between a periphery of the planar film sheet to an interior of the planar film sheet;
   cutting the planar film sheet along the determined one or more cuts to the planar film sheet to form a lamination sample, wherein the lamination sample has a plurality of stress relief boundaries that correspond to the determined one or more cuts to the planar film sheet; and
   laminating the lamination sample to the curved surface of the optical element to form a laminated coating on the optical element, wherein adjacent stress relief boundaries of the plurality of stress relief boundaries are in contact with each other, such that the laminated coating is a continuous film across the curved surface, wherein the laminated coating on the optical element comprises a local rotation along the one or more cuts of the lamination sample, and wherein the local rotation changes polarization properties between an interior of the laminated coating to a periphery of the laminated coating.

2. The method of claim 1, wherein the laminated coating is selected from a group consisting of: a polarizer and a waveplate.

3. The method of claim 1, wherein the curved surface is selected from a group consisting of: a spherical surface, an aspheric surface, a free form surface, a convex surface, and a concave surface.

4. The method of claim 1, wherein the laminated coating is a circular polarizer.

5. The method of claim 1, wherein the optical element is a component of a pancake lens assembly in a head-mounted display.

6. The method of claim 1, further comprising utilizing the laminated coating as a linear polarizer in combination with a quarter-waveplate laminated coating to mitigate an effect of the local rotation.

7. The method of claim 1, further comprising aligning effects of the local rotation with effects of another local rotation on another optical element such that the effects of each local rotation counteracts the other.

8. A non-transitory computer-readable storage medium storing executable computer program instructions, the instructions executable to perform steps comprising:

determining one or more cuts to a planar film sheet based in part on a curved surface of an optical element, wherein the curved surface is curved in at least two dimensions, and wherein the determined one or more cuts to the planar film sheet comprises a spiral pattern between a periphery of the planar film sheet to an interior of the planar film sheet;

cutting the planar film sheet along the determined one or more cuts to the planar film sheet to form a lamination sample, wherein the lamination sample has a plurality of stress relief boundaries that correspond to the determined one or more cuts to the planar film sheet; and laminating the lamination sample to the curved surface of the optical element to form a laminated coating on the optical element, wherein adjacent stress relief boundaries of the plurality of stress relief boundaries are in contact with each other, such that the laminated coating is a continuous film across the curved surface, wherein the laminated coating on the optical element comprises a local rotation along the one or more cuts of the lamination sample, and wherein the local rotation changes polarization properties between an interior of the laminated coating to a periphery of the laminated coating.

9. The computer-readable medium of claim 8, wherein the laminated coating is selected from a group consisting of: a polarizer and a waveplate.

10. The computer-readable medium of claim 8, wherein the curved surface is selected from a group consisting of: a spherical surface, an aspheric surface, a free form surface, a convex surface, and a concave surface.

11. The computer-readable medium of claim 8, wherein the laminated coating is a circular polarizer.

12. The computer-readable medium of claim 8, wherein the optical element is a component of a pancake lens assembly in a head-mounted display.

* * * * *